Feb. 8, 1938.  E. G. PARVIN  2,107,874

VALVE CONTROL APPARATUS

Filed Feb. 4, 1937   3 Sheets-Sheet 1

INVENTOR.
Edward G. Parvin
BY
Darby & Darby
ATTORNEYS

Feb. 8, 1938.  E. G. PARVIN  2,107,874
VALVE CONTROL APPARATUS
Filed Feb. 4, 1937  3 Sheets-Sheet 2
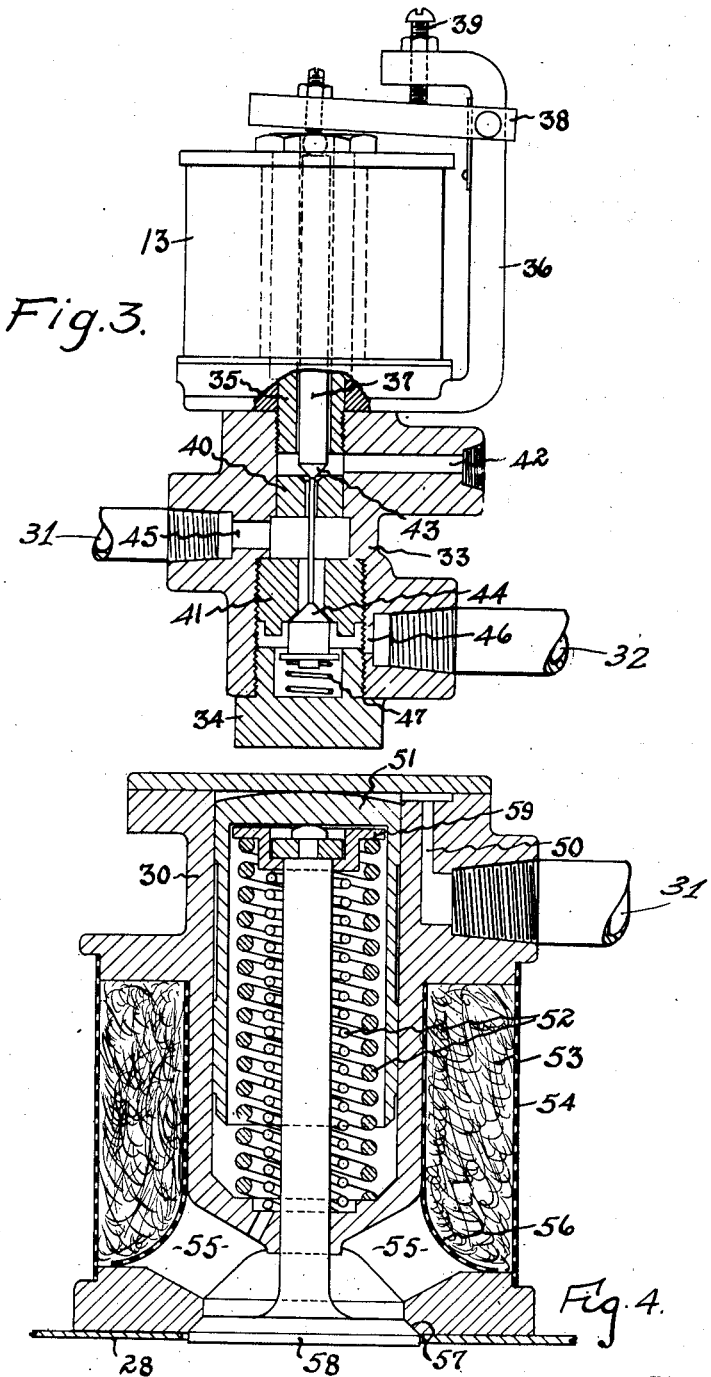
INVENTOR.
Edward G. Parvin
BY
Darby & Darby
ATTORNEYS Feb. 8, 1938.　　　　　E. G. PARVIN　　　　　2,107,874
VALVE CONTROL APPARATUS
Filed Feb. 4, 1937　　　3 Sheets-Sheet 3

INVENTOR.
Edward G. Parvin
BY
ATTORNEYS

Patented Feb. 8, 1938

2,107,874

UNITED STATES PATENT OFFICE 2,107,874

VALVE CONTROL APPARATUS

Edward G. Parvin, Roselle, N. J., assignor to National Pneumatic Company, Rahway, N. J., a corporation of West Virginia Application February 4, 1937, Serial No. 123,974

23 Claims. (Cl. 123—124)

This invention relates to improvements in the control of valves such as are employed on the intake of internal combustion engines and by means of which the intake is directly open to the atmosphere under predetermined operating conditions to eliminate fuming and gassing common to such engines.

There are known in the art systems of this general type particularly developed for use in connection with internal combustion engines on vehicles such as trucks, buses and the like. It is usual in the operation of such vehicles that a considerable quantity of gas and fumes are thrown off by the exhaust when the accelerator is retarded and the engine is being driven at a greater than idling speed by the momentum of the vehicle itself. At these times the quantity of gas and vapors generated, which is not only injurious to health but obnoxious to the sense of smell, is large, and it frequently happens, especially in the operation of buses, that these gases are sucked into the coach body and become a source of annoyance to the passengers.

In order to eliminate this fuming it has been proposed to provide an automatically operating valve on the intake of the engine which is closed during the normal operation of the vehicle when it is being driven by the engine but which opens automatically when the accelerator, and hence the carburetor, is in idling position or is moved towards idling position, and the vehicle is driving the engine at a speed greater than that corresponding to the position of the accelerator. The result is that the carburetor is bypassed and only fresh air is drawn into the cylinders and discharged from the exhaust. A characteristic of the automatic operation of such a valve is that when the vehicle speed falls to that corresponding, or approximately corresponding, to the idling speed of the engine the valve closes, with the result that an explosive mixture again travels to the engine to operate it. One example of such a system is shown in United States Patent No. 2,035,775, dated March 31, 1936, to John H. Vander Veer.

In a system of this type the air inlet valve is rendered automatic in its operation by interconnection with the vehicle generator. In such a system when the engine speed falls to a predetermined value the output of the generator has likewise fallen to a point where the air inlet valve automatically closes if the accelerator is in idling position (it having closed already if the accelerator is in any other position).

Recent developments in the heavy vehicle field, and particularly in bus construction, have necessitated the redesign of the generators so that their output is not sufficiently sensitive to changes in speed, which is the reason for the redesign, with the result that it is not possible with such generators to effect the automatic operation of the air inlet valve described above and disclosed in full detail in the above mentioned patent.

The general object of this invention is to provide a system of this type interconnected with the ignition system and subject to the frequency of pulsation in the primary circuit thereof whereby when the engine speed falls to a predetermined value and the accelerator is in idling position the air valve is automatically closed.

The detailed objects of this invention in addition to the general object will be apparent from the following description.

This invention resides substantially in the combination, construction, arrangement and relative location of parts, all as will be described in the following specification.

In the accompanying drawings,

Figure 3 is a vertical, central, cross-sectional view with some parts in elevation of the magnet valve;

Figure 4 is a vertical, central, cross-sectional view of the air inlet valve;

Figure 1:
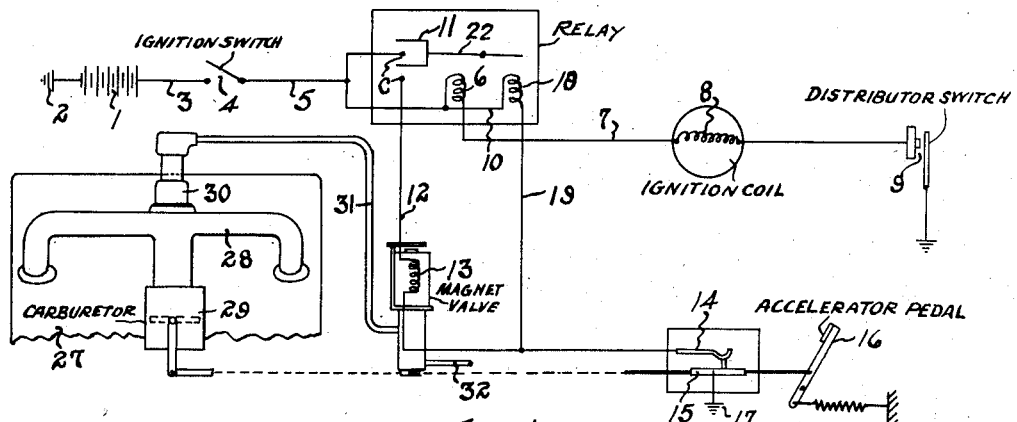
Figure 1 is a diagrammatic view of the system in accordance with this invention.

At 1 is shown the battery usually employed in connection with internal combustion engines and particularly in vehicles such as trucks and buses. As is usual, one terminal of this source is grounded, as indicated at 2. The other terminal is connected by wire 3 through the ignition switch 4 and by wire 5 to one terminal of a series magnet 6 of a relay. The other terminal of the magnet is connected by wire 7 to one terminal of the primary of the ignition coil 8, the other terminal of which is connected to ground through the usual distributor switch 9.

The switch portion of the relay comprises a pair of fixed contacts C, C, and a movable contact 11 which is moved into engagement with the fixed contacts when the winding 6 is properly energized. Wire 5 is connected by wire 10 to one of these contacts C and to one terminal of a shunt magnet 18. The other contact C is connected by wire 12 to the magnet winding 13 of a magnet valve of any suitable form. There are many known types of magnet valves suitable for the purpose. The magnet valve controls the air inlet valve 30 mounted or associated with the intake manifold 28, of the internal combustion engine so that when the winding 13 is energized the valve is open to permit of the direct entry of air into the intake manifold between the engine and the carburetor 29. The other terminal of the magnet 13 is connected to a fixed contact 14 of the accelerator switch. The other terminal of the shunt magnet 18 is connected by wire 19 to the contact 14. The accelerator 16 is provided with a movable contact 15 which is grounded as shown at 17. The movable contact 15 engages the fixed contact 14 at all times when the accelerator is at its released position, that is, the idling position for the engine. As soon as the accelerator is depressed to speed up the engine, contact 15 disengages contact 14. If desired, and as disclosed in the above mentioned patent, a form of switch may be employed which immediately completes the circuit from the magnet valve winding 13 to ground upon any retardation of the accelerator towards idling position. It is to be understood, therefore, that the accelerator switch herein disclosed is intended to be of this type.

Figure 2:
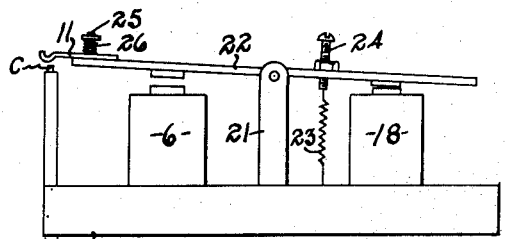
Figure 2 is a side elevational view of the relay employed.

The details of a suitable form of relay have been shown in Figure 2. It comprises a base 20 upon which the series magnet 6 and the shunt magnet 18 are mounted. At 21 is a standard on which is pivotally mounted intermediate its ends a lever 22. An adjustable screw 24 is mounted on the lever and is connected to the base 20 by means of a spring 23. This spring is adjustable and normally biases the lever to the position shown in the figure. The lever is provided with a pair of magnetizable armatures so as to be movable by magnetization of either of the coils 6 or 18. The movable contact 11 is mounted on the end of lever 22 by means of a pin 25 and a spring 26 so as to be yieldably supported thereon. It projects so as to be engageable with the contacts C, supported on a suitable insulating support integral with or attached to the base 20.

A suitable form of magnet valve is shown in Figure 3. It comprises a casing 33 which is closed at one end by the removable cap screw 34, and at the other by means of a tubular housing 35 which is provided with an upwardly extending arm 36. Pivotally mounted on this arm is the armature 38 which is arranged to engage an adjustable stop screw 39. The magnet winding 13 of the valve is mounted upon the tubular member 35. Extending downwardly through the tubular member is a valve stem 37 the upper end of which is engaged by the armature 38. Formed on the valve stem 37 are a pair of opposed valves 43 and 44 which seat respectively and alternately on seating surfaces formed in the apertured blocks 40 and 41 which divide the chamber of the casing into separated parts. The passage 42 in the casing communicates with the chamber above the block 40. The passage 45 communicates with the chamber between the blocks 40 and 41, and passage 46 communicates with the chamber below the block 41. A spring 47 engages the valve stem and normally holds valve 44 closed and valve 43 open when the winding 13 is de-energized. The pressure fluid supply pipe 32 of Figure 1 is connected with the passage 46. Pipe 31 which extends to the air inlet valve is connected with passage 45. Passage 42 is the exhaust passage to atmosphere. When the valve is in the position shown the pressure fluid cannot reach the air inlet valve (Fig. 4). However, when winding 13 is energized valve 43 seats and valve 44 unseats in an obvious manner, connecting passage 45 with passage 46, so that air is supplied to the air inlet valve. When the winding is de-energized the magnet valve returns to the position shown, so that pipe 31 is open to atmosphere through passage 42. The stop screw 39 may be adjusted to insure proper seating of valve 44.

The air inlet valve comprises a suitably formed casing 30 to provide a cylinder in which the piston 51 may operate. Air may be supplied to the cylinder above the piston from the pipe 31 through the passage 50 in the casing. The valve disc 58 is held on its seat 57 by means of a set of springs which lie between the lower end of the cylinder and the washer member 59 secured to the end of the piston rod by means of the springs 52. It will be seen that the valve 58 is not directly connected to the piston 51 but will substantially move back and forth with it because of the springs 52. The casing 30 is provided with an annular channel which is closed by means of a screen 54 which holds in place a suitable screening or filtering material 53. The ports 55 receive air from the outside through the screening material and deliver it through the main valve opening into the intake manifold 28 when air is supplied to depress the piston 51. It will be noted that the ports 55 are also covered with the screen 56 to prevent the filtering material from getting into the intake manifold.

Figure 6:
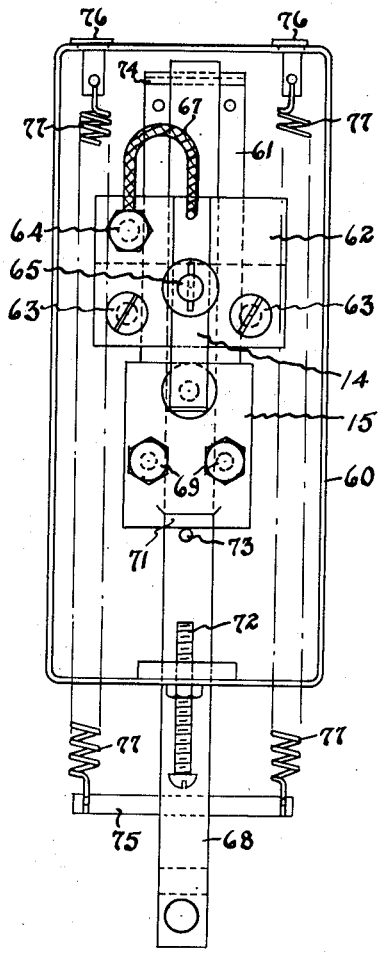
Figure 6 is a top plan view thereof with the cover of the switch box removed.
Figure 5:
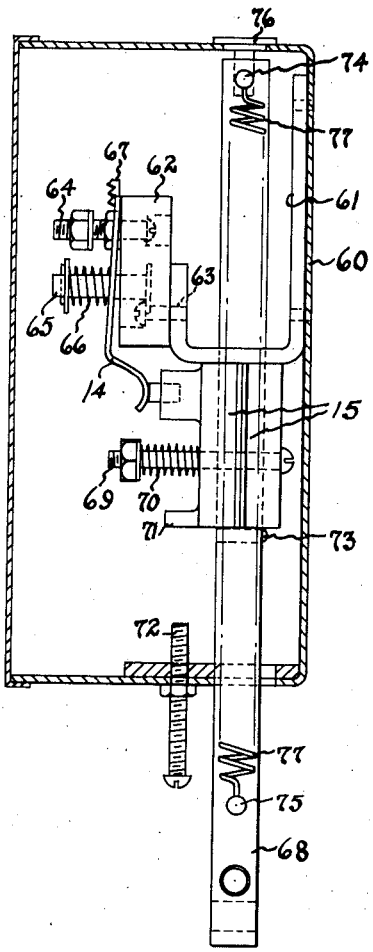
Figure 5 is a sectional view through the casing of the accelerator switch showing the switch parts in elevation.

A switch suitable for the operation of this invention is shown in Figures 5 and 6. It comprises a housing 60, in which is secured a U-shaped bracket 61 on which is mounted the block of insulating material 62. This block is secured thereto by means of the screws 63. A terminal base 64 is mounted on this insulating support and connected by means of the pig tail 67 to a resiliently mounted contact finger 14. This contact finger is held in place by means of a stud 65 and a spring 66. Projecting through an opening in the casing and an opening in the bracket 61 is a longitudinally slidable bar or rod 68 upon which is mounted the relatively movable or slidable member 15 comprising a pair of complementary parts which fit around it and are held in position by means of a pair of bolts 69 and the springs 70. Thus the parts of the member 15 frictionally engage the bar but are not directly secured thereto. One of these members is provided with a stop 71 positioned to engage the stop screw 72. When the switch is in closed position as shown in Figure 5, a projecting pin 73 engages the member 15. A transversely extending pin 74 is provided to limit the outward movement of the bar 68. At the other end of the bar is a transversely extending pin 75 to the ends of which are secured a pair of springs 77. These springs are attached at their other ends to the housing by means of the pins 76. This switch is arranged to be directly connected to the accelerator pedal so as to be actuated thereby. As soon as the pedal is depressed it pulls the bar 68 outwardly against the resistance of springs 77, carrying the member 15 with it until the stop 71 engages the stop screw 72. This represents but a short portion of the total possible longitudinal movement of the bar 68. As soon as the member 15 begins to move contact finger 14 moves out of engagement with it, breaking circuit to the magnet valve 13. It may be noted that the contact on member 15 is not insulated from it since this contact is to be grounded. Any predetermined return movement of the accelerator pedal towards idling position and hence return movement for member 68, carries the member 15 with it so that it moves into contact with spring finger 14. It will be seen that by adjusting the stop screw 72 the amount of movement necessary to effect this result may be controlled. When the accelerator pedal is fully retarded the switch is in the position shown, and the pin 73 engages the member 15 to insure of it being firmly held against the bracket 61, and in closed circuit position. Thus it will be seen that until resisted by an outside member the slide member 15 moves with the bar 68 but its movement is relatively limited with respect to the total movement of bar 68.

The operation of the mechanism will now be described. Assume that the engine is running and at idling speed. At this time switch 4 will be closed and a pulsating direct current will be flowing from the battery through wire 3, switch 4, wire 5, winding 6, wire 7, ignition coil primary 8, and distributor 9 to ground. At idling speed the frequency of these pulsations will be low enough so that lever 22 will remain in the position shown in Figure 2, at which time the circuit at contacts C, C is broken. Any tendency for the lever to move from this position or, as a matter of fact, to vibrate because of the pulsating current in the coil 6 is prevented by the biasing spring 23 and by magnetization of the winding 18 caused by current flowing from wire 5 through wire 10, winding 18, wire 19, accelerator switch contacts 14 and 15 to ground at 17.

To speed up the engine, the accelerator 16 is depressed. As soon as it is depressed the circuit at contacts 14 and 15 is broken. When the engine speed moves up to a predetermined value, which will be not much higher than idling speed, the frequency of the pulsating direct current through the winding 6 will have become high enough so that lever 22 is operated to move contact 11 into engagement with the contacts C, C. In other words, the winding 6 because of its inductance will, at the particular predetermined frequency referred to, attract and hold the lever 22 against the reaction of spring 23 in a position where contact 11 engages the contacts C, C. At this time, of course, winding 18 is de-energized. From then on up to full speed of the engine the circuit to the magnet valve 13 will be completed through the relay and up to contact 14. As soon as the accelerator is returned to idling position, or if the form of switch Fig. 9 as shown in the above mentioned patent to Vander Veer No. 2,035,775 is employed, as soon as the accelerator is retarded towards idling position, the circuit to the magnet valve winding 13 will be completed to ground and the magnet valve will operate valve 30, permitting introduction of air directly into the intake manifold. This will stop fuming because the engine is now pumping only fresh air. Winding 18 is energized but it is not strong enough, acting through an air gap, to move the lever back to the position shown in Figure 2 even with the aid of spring 23. However, when the engine speed falls to approximately idling speed, or, that is, to a predetermined value, the frequency of pulsations of the direct current will have fallen since, of course, the distributor speed is proportional to the engine speed, which is in turn proportional to the vehicle speed, to a point where magnet valve 18 and spring 23 can overcome the strength of the reduced field of magnet 6, with the result that the circuit to magnet valve 13 is broken at 11. The magnet valve immediately cuts off the supply of air to valve 30 which closes so that no fresh air goes into the intake manifold whereupon an explosive mixture again reaches the engine from the carburetor and the engine goes into normal operation. The coil 18 and spring 23 also have the additional function of preventing undesired jiggling or vibration of lever 22 especially in the neighborhood of the critical speed or, that is, the predetermined speed at which the magnet 6 is to release the lever 22. It is obvious that the speed at which the circuit to the magnet valve 13 is broken can be readily adjusted in a number of ways, as, for example, by adjusting the tension of spring 23 by means of screw 24.

From the above description it will be apparent to those skilled in the art that I have devised a form of mechanism illustrated by but one example which may be embodied in many other physical forms and connected up in other ways without departure from the novel scope of this invention. I do not, therefore, desire to be strictly limited to this disclosure but prefer rather to be limited to the field of protection defined by the claims granted me.

What I claim is:

1. The combination with the intake of an internal combustion engine and an accelerator, of means connected to and controlled by the accelerator and the ignition circuit for the internal combustion engine for introducing air into the intake manifold when the accelerator moves toward idling position from any operating position and the engine is operating above a predetermined speed.

2. The combination with the intake of an internal combustion engine and an accelerator, of means connected to and controlled by the accelerator and the ignition circuit for the internal combustion engine for introducing air into the intake manifold when the accelerator is in idling position and the engine is operating above a predetermined speed.

3. The combination with the intake manifold of an internal combustion engine, the ignition system therefor, and an accelerator control therefor, of means for admitting air to the intake manifold controlled by the accelerator and the frequency of the current in the ignition system.

4. The combination with the intake manifold of an internal combustion engine and a throttle control therefor, of means for admitting air directly into the intake manifold controlled by the throttle control and the ignition system of the engine, said means operating to admit air into the intake manifold when the engine is operating above idling speed and the throttle control is retarded from any operating position towards idling position or is in idling position.

5. The combination with the intake manifold of an internal combustion engine, of a fuel throttle control therefor, an engine ignition system, and means interconnected with the throttle control and the ignition system for operating said means to admit air into the manifold when the throttle control is moved towards its idling position from any operating position and the engine is operating at speeds greater than idling speed.

6. In an apparatus for use with an internal combustion engine, the combination comprising a valve for admitting air to the intake manifold of the engine, an ignition system for the engine, an accelerator control for the engine, and means interconnecting the accelerator control and the ignition system for opening said valve to admit air to the engine when the accelerator control is moved towards idling position or is at idling position and the engine is operating above idling speed.

7. In an apparatus for use with an internal combustion engine, the combination comprising a valve for admitting air to the intake manifold of the engine, an ignition system for the engine, an accelerator control for the engine, and means interconnecting the accelerator control and the ignition system for opening said valve to admit air to the engine when the accelerator control is moved towards idling position or is at idling position and the engine is operating above idling speed and the frequency of the current in the ignition system is above a predetermined value.

8. In an apparatus for use with an internal combustion engine, the combination comprising a valve for admitting air to the intake manifold of the engine, an ignition system for the engine, an accelerator control for the engine, means interconnecting the accelerator control and the ignition system for opening said valve to admit air to the engine when the accelerator control is moved towards idling position or is at idling position and the engine is operating above idling speed and the frequency of the current in the ignition system is above a predetermined value, and means for closing the valve when the frequency of the current in the ignition system falls below a predetermined value.

9. In an apparatus for admitting air to the intake manifold of an internal combustion engine, the combination comprising an air control valve, an ignition system for the engine, an accelerator for the engine, and means interconnecting the ignition system, accelerator control and valve whereby the valve is actuated to open position when the accelerator control is moved towards idling speed, or is at idling speed and the frequency of the pulsating current in the ignition system is above a predetermined value.

10. In an apparatus for admitting air to the intake manifold of an internal combustion engine, the combination comprising an air control valve, an ignition system for the engine, an accelerator for the engine, and means interconnecting the ignition system, accelerator control and valve whereby the valve is actuated to open position when the accelerator control is moved towards idling speed, or is at idling speed and the frequency of the pulsating current in the ignition system is above a predetermined value, said valve closing when the frequency of the current falls to a predetermined value.

11. In an apparatus as described, the combination comprising an ignition coil, a current source connected thereto, a circuit breaker interposed in the circuit, a relay having a winding interposed in the circuit, a magnet valve winding connected through the relay to said current source, and an accelerator operated switch connected in the circuit of the magnet valve.

12. In an apparatus as described, the combination comprising an ignition coil, a current source connected thereto, a circuit breaker interposed in the circuit, a relay having a winding interposed in the circuit, a magnet valve winding connected through the relay to said current source, an accelerator operated switch connected in the circuit of the magnet valve, and a magnet winding shunted around said relay and magnet valve and positioned to influence the operation of the relay.

13. In an apparatus as described the combination comprising an internal combustion engine having an intake manifold and an ignition system, a valve connected to the intake manifold for supplying air directly thereto, and means controlled by the ignition system for opening the valve when the engine speed falls below a predetermined value.

14. In an apparatus of the type described the combination comprising an internal combustion engine having an intake manifold, an ignition system for the engine, and an operating member for controlling the carburetor, a valve for introducing air directly into the intake manifold, and means controlled by the ignition system for opening said valve when the engine speed is above a predetermined value and the carburetor is at idling position.

15. In an apparatus of the type described the combination with an internal combustion engine having an intake manifold, a carburetor connected thereto, means for operating the carburetor and an ignition system, of an air inlet valve connected to the manifold, and means controlled by the ignition system for opening the valve when the carburetor operating means is moved towards idling position and the engine is operating at a speed greater than that corresponding to the position of said means.

16. In an apparatus of the type described the combination with an internal combustion engine having an intake manifold, a carburetor connected thereto, means for operating the carburetor and an ignition system, of an air inlet valve connected to the manifold, and means controlled by the ignition system for opening the valve when the carburetor operating means is moved towards idling position and the engine is operating at a speed greater than that corresponding to the position of said means, and for closing the valve when the engine speed falls to a predetermined value.

17. In an apparatus of the type described the combination with an internal combustion engine having an intake manifold, a carburetor connected thereto, means for operating the carburetor and an ignition system, of an air inlet valve connected to the manifold, and means controlled by the frequency of the current in the primary of the system for opening the valve when the carburetor operating means is moved towards idling position, and the engine is operating at a speed greater than that corresponding to the position of said means.

18. In an apparatus of the type described the combination with an internal combustion engine having an intake manifold, a carburetor connected thereto, means for operating the carburetor and an ignition system, of an air inlet valve connected to the manifold, and means controlled by the frequency of the current in the primary of the system for opening the valve when the carburetor operating means is moved towards idling position and the engine is operating at a speed greater than that corresponding to the position of said means, and for closing the valve when the engine speed falls to a predetermined value.

19. The combination with an internal combustion engine having an intake manifold, a carburetor connected thereto, means for operating the carburetor and an ignition system, of an air inlet valve connected to the manifold, means controlled by the carburetor operating means and the ignition current for opening said air inlet valve to admit air to the intake manifold when the carburetor operating means is moved towards or is in idling position, and means for closing said air inlet valve when the frequency of the ignition current falls to a predetermined value.

20. The combination with an internal combustion engine having an intake manifold, a carburetor connected thereto, means for operating the carburetor and an ignition system, of an air inlet valve connected to the manifold, means controlled by the carburetor operating means and the ignition current for opening said air inlet valve to admit air to the intake manifold when the carburetor operating means is moved towards or is in idling position and the engine is operating above a predetermined speed, and means for closing said air inlet valve when the engine speed falls to a lower predetermined value.

21. The combination with an internal combustion engine having an intake manifold, a carburetor connected thereto, means for operating the carburetor and an ignition system, of an air inlet valve connected to the manifold, means controlled by the carburetor operating means and the ignition current for opening said air inlet valve to admit air to the intake manifold when the carburetor operating means is moved towards or is in idling position and the frequency of the current in the ignition system is above a predetermined value, and means for closing said air inlet valve when the frequency of the current in the ignition system falls to a lower predetermined value.

22. The combination with the intake of an internal combustion engine and an accelerator, of means connected to and controlled by the accelerator and the ignition circuit for the internal combustion engine when introducing air into the intake manifold when the accelerator moves toward idling position from any operating position and the engine is operating above a predetermined speed, and for cutting off the introduction of air into the intake manifold when the speed of the engine falls to a predetermined value.

23. In an apparatus of the type described, the combination with an internal combustion engine having an intake manifold, a carburetor connected thereto, means for operating the carburetor and an ignition system, of a power operated air inlet valve connected to the manifold, an electrically operated control valve for said air valve, a switch mechanically connected to the means for operating the carburetor, and a relay electrically connected to the electrically operated control valve and said switch, said relay being connected in series with the primary circuit of the ignition system.

EDWARD G. PARVIN.